United States Patent [19]

Beyer

[11] Patent Number: 4,750,811

[45] Date of Patent: Jun. 14, 1988

[54] VIEWING AIR FOR HUNTERS

[76] Inventor: John H. Beyer, 19876 Elm Ct., Harper Woods, Mich. 48225

[21] Appl. No.: 86,282

[22] Filed: Aug. 17, 1987

[51] Int. Cl.⁴ .............................................. G02B 5/08
[52] U.S. Cl. ..................................... 350/277; 350/639
[58] Field of Search ............ 350/276 SL, 276 R, 277, 350/278, 279, 280, 281, 282, 283, 631, 639

[56] References Cited

U.S. PATENT DOCUMENTS

| 564,454 | 7/1896 | Ryan . | |
|---|---|---|---|
| 2,311,400 | 2/1943 | Landell | 350/278 |
| 2,573,443 | 10/1951 | Holland | 350/639 |
| 2,732,764 | 1/1956 | Parks | 350/639 |
| 2,995,983 | 8/1961 | Davis | 350/283 |
| 3,205,777 | 9/1965 | Brenner | 350/639 |
| 3,781,093 | 12/1973 | Grabijas | 350/639 |
| 3,806,189 | 4/1974 | Simjian . | |
| 4,068,930 | 1/1978 | Marcus | 350/277 |
| 4,385,284 | 5/1983 | Gould et al. | 350/268 |
| 4,487,479 | 12/1984 | Tolomeo | 350/615 |
| 4,586,788 | 5/1986 | Hansen | 350/283 |

Primary Examiner—John K. Corbin
Assistant Examiner—Martin Lerner
Attorney, Agent, or Firm—Peter D. Keefe

[57] ABSTRACT

A rearview mirror for hunters which is adjustable, portable, and protected against undesirable light reflection and image detection by game animals. The invention uses a mirror universally mounted to a telescoping pole. The telescoping pole is connected to a base having a flat surface and a number of stake-like legs for insertion into the ground. A pivotable hood is mounted to the mirror. A pattern is superposed the mirror to confuse the image that may be seen by game animals.

18 Claims, 1 Drawing Sheet

VIEWING AIR FOR HUNTERS

BACKGROUND OF THE INVENTION

1. Field of the Invention

This invention relates to rearview mirrors, particularly rearview mirrors used by hunters to view the approach of game from the rear.

2. Discussion of the Prior Art

Hunters who hunt game animals, such as deer, generally remain in a fixed, quiet stance. This may take, for instance, the form of being located in a "blind" or sitting motionless in the woods. In any event, because the hunter must be still, he is generally unable to turn constantly about in order to survey the condition of the forest on all sides of him. This is because deer and other game animals are very wary of motion, causing them to be "spooked" and run away. Hence, the hunter is generally only continually aware of game movements in his forward line of sight and only marginally, if at all, aware of game movements behind him. This is a severe handicap because quite often game animals can "sneak up" on the hunter from behind, finding him off guard, and successfully escape the hunter's most skillful and earnest attempts at killing it.

In the prior art, it is known to use a mirror positioned in the forward line of sight of the hunter in order to reflect light from the lands behind the hunter. An example of such a device is U.S. Pat. No. 4,487,479 to Tolomeo, Sr., which discloses a three part rearview mirror which is strapped to a tree trunk. While this mirror can reveal information on game movements behind the hunter, it suffers from possible glare and glinting due to reflected sunlight, a defect which can spook game animals and cause the hunter much discomfort. Additionally, while the hunter can use the mirror to perceive game animals, the game animals may notice the hunter's image on the mirror, seeing the hunter's silhouette or his movement, causing them to be spooked. The latter problem may be compounded by the game animal seeing itself or other game animals. The tree mounting requirement is a disadvantage to hunters in more open terrain.

Accordingly, what is needed in the art is a rearview mirror which does not suffer from possible glare and glinting effects, silhouette spooking of the game animals, and limited affixing location possibilities.

SUMMARY OF THE INVENTION

The present invention provides a light, portable hunter's rearview mirror which eliminates glare and glinting, prevents game animal spooking and is affixable anywhere.

A rearview mirror is mounted to a telescoping pole. The pole has a base provided with stakes for insertion into the ground by merely stepping on the base. The mirror is provided with an anti-glare, anti-glinting sun hood which also folds down to protect the mirror surface during transportations. Attached to the rearview mirror is a covering which covers the mirror surface. The covering has camouflage designs printed thereon to confuse game animals, preventing them from perceiving a discernable image on the mirror. A non-reflective finish covers all parts surfaces, except the mirror surface, to ensure the invention blends unobtrusively with the game animal habitat.

Accordingly, it is an object of the present invention to provide a rearview mirror for hunters which is light, portable, sturdy and protected during transportation.

It is a further object of the present invention to provide a rearview mirror for hunters which has a holding structure that is adjustable and allows for easy affixing anywhere.

It is yet a further object of the present invention to provide a rearview mirror for hunters which has protection against glare and glint off of the sun.

It is still a further object of the present invention to provide a rearview mirror for hunters which has provision for preventing game animals from perceiving an image on the mirror so that they cannot be spooked by placement of the invention in their habitat.

It is yet another object of the present invention to provide a rearview mirror for hunters which is unobtrusive in that all surfaces, except the mirror surface itself, are covered by an non-reflective finish.

These, and additional objects, advantages, features and benefits of the present invention shall become apparent from the following specifications.

DETAILED DESCRIPTION OF THE PREFERRED EMBODIMENT

Figure 1:
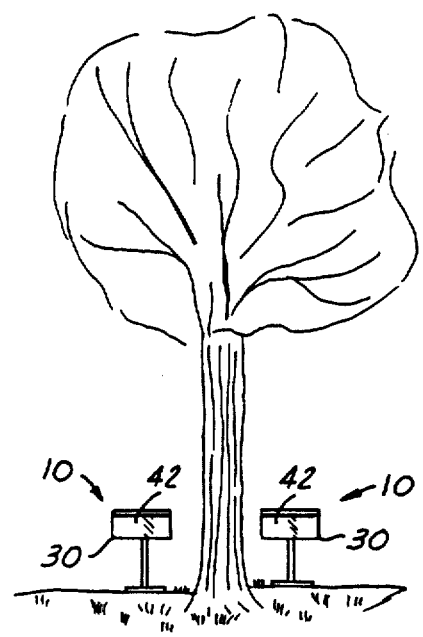
FIG. 1 is a frontal view showing the invention in operation.

Referring now to the figures, FIG. 1 shows two identical embodiments of the invention 10 being used in a typical hunting setting. Each embodiment of the invention 10 has a rearview mirror 30. The hunter, not shown, is situated in relation to each of the rearview mirrors 30 so that his eyes perceive the scene shown by the figure in the manner portrayed by the figure. With the hunter's eyes facing the rearview mirrors 30, images from the terrain behind him are visible in the surfaces 42 of each the rearview mirrors 30.

Figure 2:
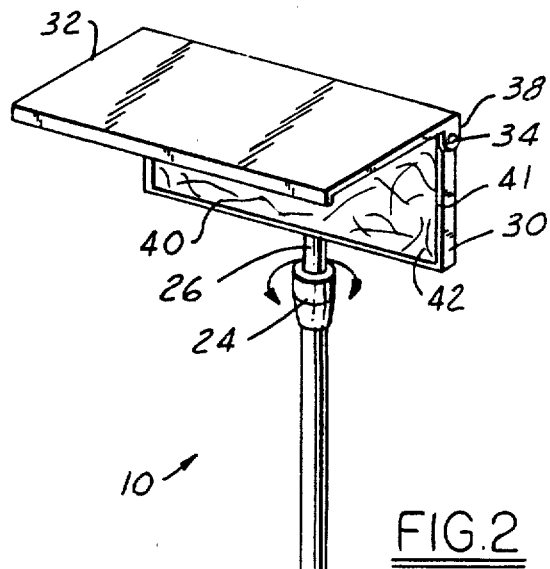
FIG. 2 is a perspective view of the invention.
Figure 3:
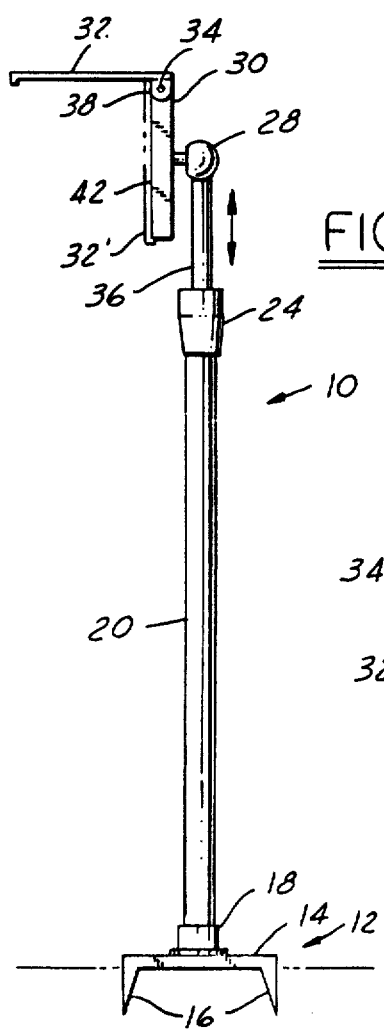
FIG. 3 is a side view of the invention.
Figure 4:
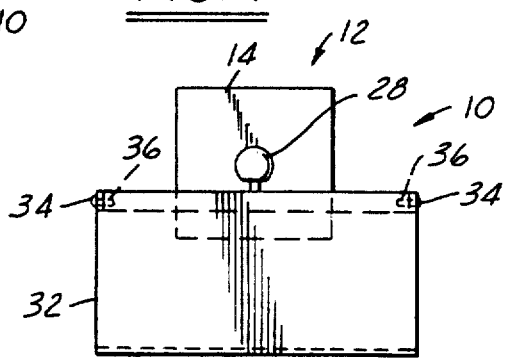
FIG. 4 is a plan view of the invention.

FIGS. 2-4 particularly show the construction of the invention 10. A base 12 is provided for anchoring the invention to the ground. This is accomplished by means of a generally flat surface 14, here shown being equilateral in shape, on one side of which is attached a plurality of stake-like legs 16, here shown to be four in number, that is, one for each corner of the flat surface 14. The legs 16 are intended for insertion into the ground. This is achieved by the hunter stepping on the flat surface 14, whereby his weight causes the legs 16 to penetrate into the soil. Attached to the other side of the flat surface 14, is a connection member 18 which allows connection of a telescoping pole 20. The telescoping pole as an adjuster member 24 which allows the hunter to raise and lower the height of the telescoping pole 20 to a desired elevation. The telescoping pole 20 has attached at its upper end 26 a swivel connector 28 for attaching a rearview mirror 30. The swivel connector 28 allows the rearview mirror 30 to be universally moved to adjust its field of view relative to the hunter and his rear. A hood 32, for eliminating sun glare and glint, is pivotably attached to the rearview mirror 30 by means of hinges 34, each in the form of a bolt 36 penetrating apertures in the rearview mirror and a lip 38 on the hood 32. A camouflage patterned covering 40 serves to break-up the images reflected in the rearview mirror 30 so that game animals will be unable to perceive any form of excitable image off of the reaview mirror 30. The covering 40 may take the form of a screen placed over the mirror surface 42 or a painted or printed pattern applied to the mirror surface 42. All of the foregoing components, except the mirror surface 42, are coated or painted with a non-reflective finish.

In operation, the hunter would carry the invention 10 with the telescoping pole 20 fully retracted and the hood 32 rotated down over the rearview mirror 30; this latter configuration of the invention is shown in outline as 32a in FIG. 3. when a suitable hunting location is selected, the invention 10 is placed on the ground by means of the base 12. The hunter then steps on the base, driving the legs 16 into the soil. The hood 32 is then rotated upwardly, exposing the mirrored surface 42 of the rearview mirror 30. The hunter then retires to his selected hunting vantage point and examines the adjustment of the invention for clear and effective perception of the terrain behind him. The hunter, if necessary, then goes back to the invention 10, and adjusts the height and angle of the rearview mirror 30, as well as the hood to ensure that the sun will pose no difficulties to his hunting pleasure.

Figure 5:
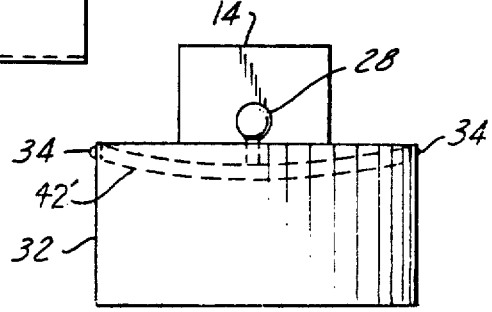
FIG. 5 is a plan view of the invention wherein a convex mirror is used.

An alternative of the foregoing description of the preferred embodiment, is to make the mirror surface convex in shape in order to give the hunter a wider field of view than is possible with a straight surfaced mirror. This is shown in FIG. 5, where the mirror surface 42' is seen to be convexly curved.

Components described in the foregoing description of the preferred embodiment are intended for illustration only and could be modified without departing from the spirit of the invention; for instance, welding could substitute for the connection member 18. Accordingly, to those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. An aid for hunters of game animals, comprising:
   a mirror;
   mounting means attached to said mirror for adjustably positioning said mirror;
   means attached to said mirror for selectively eliminating sun induced glint and glare reflected off said mirror; and
   means adjacent said mirror for superposing a pattern over said mirror for causing discontinuous images to be reflected from said mirror in order to prevent said game animals from perceiving their image in said mirror.

2. The aid for hunters of game animals as recited in claim 1, wherein said mounting means comprises:
   a flat surface;
   a plurality of spaced apart legs connected to one end of said flat surface;
   a telescoping pole connected at one end to the other side of said flat surface; and
   a swivel connected to the other end of said telescoping pole, and swivel further being connected to said mirror for providing universal movement of said mirror relative to said telescoping pole.

3. The aid for hunters of game animals as recited in claim 1, wherein said means for eliminating sun induced glint and glare off said mirror comprises a hood pivotably mounted to said mirror.

4. The aid for hunters of game animals as recited in claim 3, wherein said hood has a size that is substantially similar that of said mirror and said hood may be pivoted to a position adjacent and parallel to said mirror for protecting said mirror during transportation.

5. The aid for hunters of game animals as recited in claim 1 wherein said means for superposing a pattern over said mirror comprises a screen adjacent said mirror, said screen having patterns thereon.

6. The aid for hunters of game animals as recited in claim 5, wherein said patterns are camouflage patterns.

7. The aid for hunters of game animals as recited in claim 1, wherein said means for superposing a pattern over said mirror comprises a pattern on said mirror.

8. The aid for hunters of game animals as recited in claim 7, wherein said patterns are camouflage patterns.

9. The aid for hunters of game animals as recited in claim 1, wherein said mirror is a convex mirror.

10. The aid for hunters of game animals as recited in claim 1, wherein only said mirror has a mirrored surface and all surfaces of said aid for hunters not having a mirrored surface are covered with a non-reflective finish.

11. An aid for hunters of game animals, comprising:
    a mirror;
    a swivel connected to said mirror for providing universal movement of said mirror;
    a telescoping pole connected at one end to said swivel;
    a flat surface connected at one end to the other end of said telescoping pole;
    a plurality of spaced apart legs connected to the other end of said flat surface;
    a hood pivotably mounted to said miror for selectively eliminating glare and glint due to reflection of sunlight off said mirror; and
    means adjacent said mirror for superposing a pattern over said mirror for causing discontinuous images to be reflected from said mirror in order to prevent said game animals from perceiving their image in said mirror.

12. The aid for hunters of game animals as recited in claim 11, wherein said hood has a size that is substantially similar that of said mirror and said hood may be pivoted to a position adjacent and parallel to said mirror for protecting said mirror during transportation.

13. The aid for hunters of game animals as recited in claim 11, wherein only said mirror has a mirrored surface and all surfaces of said aid for hunters excepting said mirrored surface are covered with a non-reflective finish.

14. The aid for hunters of game animals as recited in claim 11, wherein said means for superposing a pattern over said mirror comprises a screen adjacent said mirror, said screen having patterns thereon.

15. The aid for hunters of game animals as recited in claim 14, wherein said patterns are camouflage patterns.

16. The aid for hunters of game animals as recited in claim 11, wherein said means for superposing a pattern over said mirror comprises a pattern on said mirror.

17. The aid for hunters of game animals as recited in claim 16, wherein said patterns are camouflage patterns.

18. The aid for hunters of game animals as recited in claim 11, wherein said mirror is a convex mirror.

* * * * *

UNITED STATES PATENT AND TRADEMARK OFFICE
CERTIFICATE OF CORRECTION

PATENT NO. : 4,750,811
DATED : June 14, 1988
INVENTOR(S) : John H. Beyer

It is certified that error appears in the above-identified patent and that said Letters Patent is hereby corrected as shown below:

```
Title of Invention should read
-- Viewing Aid For Hunters --.

Column 1, line 62, "transportations" should read
-- transportation --.

Column 3, line 14, "when" should read -- When --.
```

Signed and Sealed this

Twenty-eighth Day of March, 1989

Attest:

DONALD J. QUIGG

Attesting Officer

Commissioner of Patents and Trademarks